US010272328B2

United States Patent
Knutsson et al.

(10) Patent No.: US 10,272,328 B2
(45) Date of Patent: Apr. 30, 2019

(54) METHOD OF DESIGNING MULTIPLE COMPUTER GAMES

(71) Applicant: KING.COM LIMITED, St. Julians, MT (US)

(72) Inventors: Sebastian Knutsson, Stockholm (SE); Patrik Stymne, Stockholm (SE); Marcus Lagerstrom, Stockholm (SE); Evgenios Rodopoulos, London (GB)

(73) Assignee: KING.COM LTD., St. Julians (MT)

( * ) Notice: Subject to any disclaimer, the term of this patent is extended or adjusted under 35 U.S.C. 154(b) by 104 days.

(21) Appl. No.: 15/174,429

(22) Filed: Jun. 6, 2016

(65) Prior Publication Data

US 2016/0279521 A1  Sep. 29, 2016

Related U.S. Application Data

(63) Continuation of application No. 14/029,318, filed on Sep. 17, 2013.

(30) Foreign Application Priority Data

Feb. 6, 2013 (GB) .................................... 1302121.7
Feb. 19, 2013 (GB) .................................... 1302910.3
(Continued)

(51) Int. Cl.
*A63F 13/69* (2014.01)
*A63F 13/25* (2014.01)
(Continued)

(52) U.S. Cl.
CPC .............. *A63F 13/25* (2014.09); *A63B 71/06* (2013.01); *A63F 13/00* (2013.01); *A63F 13/005* (2013.01);
(Continued)

(58) Field of Classification Search
CPC ........ A63F 2300/251; A63F 2300/5526; A63F 2300/6009
(Continued)

(56) References Cited

U.S. PATENT DOCUMENTS

| 5,488,496 A | 1/1996 | Pine |
| 6,068,552 A | 5/2000 | Walker et al. |

(Continued)

FOREIGN PATENT DOCUMENTS

| DE | 10304725 A1 | 9/2004 |
| EP | 1564698 A2 | 8/2005 |

(Continued)

OTHER PUBLICATIONS

Bejeweled 3 Video Review, posted on Dec. 7, 2010 at https://www.youtube.com/watch?v=_nb4z-BpQA8.*

(Continued)

*Primary Examiner* — Omkar Deodhar
*Assistant Examiner* — Ross Williams
(74) *Attorney, Agent, or Firm* — Saul Ewing Arnstein & Lehr LLP

(57) ABSTRACT

A method of designing multiple computer games, using a software module running on a processor, in which the module enables pre-defined kinds of game design functions to be implemented across multiple different computer games; and in which the module implements multiple pre-defined kinds of common game design functions; and is extensible in that new components can be added to the module to create new functionality.

20 Claims, 6 Drawing Sheets

Related U.S. Application Data

(60) Provisional application No. 61/701,907, filed on Sep. 17, 2012, provisional application No. 61/811,019, filed on Apr. 11, 2013, provisional application No. 61/818,702, filed on May 2, 2013, provisional application No. 61/827,298, filed on May 24, 2013, provisional application No. 61/832,348, filed on Jun. 7, 2013, provisional application No. 61/832,355, filed on Jun. 7, 2013, provisional application No. 61/832,359, filed on Jun. 7, 2013, provisional application No. 61/832,362, filed on Jun. 7, 2013, provisional application No. 61/832,364, filed on Jun. 7, 2013, provisional application No. 61/832,369, filed on Jun. 7, 2013.

(30) Foreign Application Priority Data

| Date | Country | Number |
|---|---|---|
| Mar. 12, 2013 | (GB) | 1304442.5 |
| Mar. 12, 2013 | (GB) | 1304444.1 |
| Mar. 13, 2013 | (GB) | 1304545.5 |
| Apr. 4, 2013 | (GB) | 1306117.1 |
| Apr. 4, 2013 | (GB) | 1306118.9 |
| Jun. 13, 2013 | (GB) | 1310589.5 |
| Jun. 13, 2013 | (GB) | 1310592.9 |
| Jun. 21, 2013 | (GB) | 1311119.0 |
| Aug. 7, 2013 | (GB) | 1314147.8 |
| Sep. 10, 2013 | (GB) | 1316045.2 |

(51) Int. Cl.
  *G07F 17/32* (2006.01)
  *A63F 13/00* (2014.01)
  *A63B 71/06* (2006.01)
  *A63F 13/30* (2014.01)
  *A63F 13/40* (2014.01)
  *G06F 9/44* (2018.01)
  *A63F 13/428* (2014.01)
  *A63F 13/75* (2014.01)
  *A63F 13/537* (2014.01)
  *A63F 13/63* (2014.01)
  *A63F 13/46* (2014.01)
  *A63F 13/2145* (2014.01)
  *A63F 13/335* (2014.01)
  *A63F 13/822* (2014.01)
  *A63F 13/92* (2014.01)
  *A63F 13/80* (2014.01)
  *A63F 13/35* (2014.01)
  *A63F 13/79* (2014.01)

(52) U.S. Cl.
  CPC .......... *A63F 13/10* (2013.01); *A63F 13/12* (2013.01); *A63F 13/2145* (2014.09); *A63F 13/30* (2014.09); *A63F 13/335* (2014.09); *A63F 13/35* (2014.09); *A63F 13/40* (2014.09); *A63F 13/428* (2014.09); *A63F 13/46* (2014.09); *A63F 13/537* (2014.09); *A63F 13/63* (2014.09); *A63F 13/75* (2014.09); *A63F 13/79* (2014.09); *A63F 13/80* (2014.09); *A63F 13/822* (2014.09); *A63F 13/92* (2014.09); *G06F 9/44* (2013.01); *G07F 17/32* (2013.01); *G07F 17/3274* (2013.01)

(58) Field of Classification Search
  USPC .......................................... 463/30–31, 40–42
  See application file for complete search history.

(56) References Cited

U.S. PATENT DOCUMENTS

| | | |
|---|---|---|
| 6,117,013 A | 9/2000 | Eiba |
| 7,073,792 B2 | 7/2006 | Esposito et al. |
| 7,749,060 B1 | 7/2010 | Olmes et al. |
| 8,002,633 B2 | 8/2011 | Shimizu et al. |
| 8,075,404 B2 | 12/2011 | Stamper et al. |
| 8,088,010 B1 | 1/2012 | Hill et al. |
| 8,237,743 B2 | 8/2012 | Csurka et al. |
| 8,277,320 B1 | 10/2012 | Hart et al. |
| 8,369,873 B2 | 2/2013 | Krasner et al. |
| 8,388,446 B1 | 3/2013 | Craine et al. |
| 8,526,490 B2 | 9/2013 | Buckley et al. |
| 8,672,744 B1 | 3/2014 | Steere et al. |
| 8,711,923 B2 | 4/2014 | Buckley et al. |
| 8,727,893 B2 | 5/2014 | Otremba et al. |
| 8,784,181 B2 | 7/2014 | Frank et al. |
| 8,964,830 B2 | 2/2015 | Perlman et al. |
| 9,033,803 B1 | 5/2015 | Etter et al. |
| 9,446,313 B2 | 9/2016 | Norden |
| 2002/0068632 A1 | 6/2002 | Dunlap et al. |
| 2002/0082068 A1 | 6/2002 | Singhal et al. |
| 2002/0094870 A1 | 7/2002 | Murray et al. |
| 2003/0049592 A1 | 3/2003 | Park et al. |
| 2003/0050118 A1 | 3/2003 | Suzuki et al. |
| 2003/0074416 A1 | 4/2003 | Bates et al. |
| 2003/0119581 A1 | 6/2003 | Cannon et al. |
| 2004/0053688 A1 | 3/2004 | Hosaka et al. |
| 2004/0137987 A1 | 7/2004 | Nguyen et al. |
| 2004/0224772 A1 | 11/2004 | Canessa et al. |
| 2005/0256985 A1 | 11/2005 | Shea et al. |
| 2006/0068876 A1 | 3/2006 | Kane et al. |
| 2006/0160620 A1 | 7/2006 | Matthews et al. |
| 2006/0223635 A1 | 10/2006 | Rosenberg et al. |
| 2006/0277474 A1 | 12/2006 | Robarts et al. |
| 2006/0281541 A1 | 12/2006 | Nguyen et al. |
| 2006/0287098 A1 | 12/2006 | Morrow et al. |
| 2007/0077993 A1 | 4/2007 | Midgley et al. |
| 2007/0259709 A1 | 11/2007 | Kelly et al. |
| 2008/0005353 A1 | 1/2008 | Panabaker et al. |
| 2009/0170608 A1 | 7/2009 | Herrmann et al. |
| 2009/0203415 A1 | 8/2009 | Falciglia et al. |
| 2009/0209311 A1 | 8/2009 | Bennett et al. |
| 2010/0144426 A1 | 6/2010 | Winner et al. |
| 2010/0151934 A1 | 6/2010 | Kniberg et al. |
| 2010/0218135 A1 | 8/2010 | Brugler et al. |
| 2010/0227675 A1 | 9/2010 | Luxton et al. |
| 2010/0271367 A1 | 10/2010 | Vaden et al. |
| 2010/0317437 A1 | 12/2010 | Berry et al. |
| 2011/0014977 A1 | 1/2011 | Yamazaki et al. |
| 2011/0053681 A1 | 3/2011 | Goldman et al. |
| 2011/0111835 A1 | 5/2011 | Cohen et al. |
| 2011/0136561 A1 | 6/2011 | Acres et al. |
| 2011/0136572 A1 | 6/2011 | Karn et al. |
| 2011/0230246 A1 | 9/2011 | Brook et al. |
| 2011/0269532 A1 | 11/2011 | Shuster et al. |
| 2012/0030094 A1 | 2/2012 | Khalil et al. |
| 2012/0040752 A1 | 2/2012 | Koo et al. |
| 2012/0064969 A1 | 3/2012 | Uchibori et al. |
| 2012/0077580 A1 | 3/2012 | Mahajan et al. |
| 2012/0079126 A1 | 3/2012 | Evans et al. |
| 2012/0122552 A1 | 5/2012 | Youm et al. |
| 2012/0191606 A1 | 7/2012 | Milne et al. |
| 2012/0198417 A1 | 8/2012 | Haviv et al. |
| 2012/0311036 A1 | 12/2012 | Huhn et al. |
| 2013/0035164 A1 | 2/2013 | Osvald et al. |
| 2013/0109469 A1 | 5/2013 | Hill et al. |
| 2013/0172061 A1 | 7/2013 | Iosilevsky et al. |
| 2013/0267285 A1 | 10/2013 | Kelley et al. |
| 2013/0316832 A1 | 11/2013 | Olofsson et al. |
| 2013/0323697 A1 | 12/2013 | Shadduck et al. |
| 2013/0331162 A1 | 12/2013 | Krivicich et al. |
| 2014/0024450 A1 | 1/2014 | Ramachandran et al. |
| 2014/0080600 A1 | 3/2014 | Knutsson et al. |
| 2014/0235338 A1 | 8/2014 | Hansson et al. |
| 2014/0252987 A1 | 9/2014 | Hinrichs et al. |
| 2014/0342791 A1 | 11/2014 | Valeriano et al. |

(56) References Cited

U.S. PATENT DOCUMENTS

| | | |
|---|---|---|
| 2014/0357367 A1 | 12/2014 | Lee |
| 2014/0370950 A1 | 12/2014 | Jaksch et al. |
| 2015/0050997 A1 | 2/2015 | Suzman et al. |
| 2015/0174489 A1 | 6/2015 | Evald et al. |

FOREIGN PATENT DOCUMENTS

| | | |
|---|---|---|
| EP | 1870143 A1 | 12/2007 |
| EP | 2211299 A2 | 7/2010 |
| JP | 2005-228086 | 8/2005 |
| JP | 2012-61060 A | 3/2012 |
| WO | WO01/46790 A2 | 6/2001 |
| WO | 2006039366 A2 | 4/2006 |
| WO | 2006/052212 A1 | 5/2006 |
| WO | 2007/078533 A2 | 7/2007 |
| WO | WO 2007/078533 | 7/2007 |
| WO | WO 2008/109685 A2 | 9/2008 |
| WO | 2009/029108 A1 | 3/2009 |
| WO | 2010/002897 | 1/2010 |
| WO | WO 2010/045716 A1 | 4/2010 |
| WO | 2010/083346 A1 | 7/2010 |
| WO | 2010/096784 A1 | 8/2010 |
| WO | 2011/011466 | 1/2011 |
| WO | WO 2011/041467 A2 | 4/2011 |
| WO | WO 2012/013198 A1 | 2/2012 |
| WO | WO 2003/174933 | 11/2013 |

OTHER PUBLICATIONS

"Match-3 in Construct 2: part one", posted on Dec. 16, 2011 at http://weconstruct.blogspot.com/2011/12/match-3-in-construct-2-part-one.html.*

Imapler, "Building Games Using the MVC Pattern—Tutorial and Introduction", Feb. 14, 2012 https://www.javacodegeeks.com/2012/02/building-games-using-mvc-pattern.html.*

Witters, Koen, "Game Architecture: Model-View-Controller", Jul. 13, 2009 https://www.koonsolo.com/news/model-view-controller-for-games/.*

"International Search Report, dated Jan. 16, 2014, and Written Opinion, issued in corresponding International Application No. PCT/EP2013/069289", dated Jan. 16, 2014.

Anonymous, "Amazon Survival YouTube video, Uploaded to YouTube on Mar. 13, 2009, video length 6:06", https://www.youtube.com/watch?v=8S2gM5POUUk, Mar. 13, 2009, 1.

Anonymous, "Bejeweled 2 Wikipedia Article", Sep. 30, 2015, 1-3.

Anonymous, "Bejeweled article", Wikipedia, Sep. 30, 2015.

Anonymous, "Best iOS/Androiod cross-platform mobiledevelopment SDKs", retrieved from the Internet: URL:http://webification.com/best-iosandroid-cross-platform-mobile-development-sdks [retrieved on Jul. 2, 2013] XP055069062, Sep. 26, 2011, p. 1.

Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.

Anonymous, "Buck Rodgers Turn Based Strategy Game Design and Planning Document", https://cs.nyu.edu/courses/spring07/V22.0474.001/groups/tbsgame/tbsgame_des.pdf, Feb. 21, 2007.

Anonymous, "Candy Crush Saga Facebook Game levels 1-10 video on YouTube, YouTube screen shorts figures 1-7", https://www.youtube.com/watch?v=8TleNDnJiN8, Apr. 15, 2012.

Anonymous, "Candy Crush Saga for Facebook, YouTube video demonstrating levels 1-10, video length 15:23", https://www.youtube.com/watch?v=cfqHVkWX5yE, Apr. 12, 2012, 1 page.

Anonymous, "Candy Crush Saga on Facebook Review on YouTube video, Screen shots of YouTube video, figures 1-13", https://www.youtube.com/watch?v=AbH8Givg6XM, Sep. 7, 2012.

Anonymous, "Cross-platform", retrieved from the Internet: URL:http://en.widipedia.org/w/index.php?title=Cross-platform&oldid=487867404 [retrieved on Jul. 1, 2013] XP055068984, Apr. 17, 2012, pp. 1-16.

Anonymous, "Daily Bonus Level Oct. 17, 2012: Bubble Witch Saga Fan Site", retrieved from the Internet:URL:http://bubble-witch-saga.se/daily-bonus-level-17-oct-2012/ [retrieved on Mar. 21, 2014] XP055109244, Oct. 17, 2012, pp. 1-2.

Anonymous, "Dig Dug article", Wikipedia, Sep. 30, 2015.

Anonymous, "Facebook Platform—Wikipedia, the free encyclopedia", Retrieved from the Internet: URL:http://en.wikipedia.org/w/index/php?title=Facebook_Platofrm&oldid=533105338 [retrieved on Mar. 21, 2014] XP055109249, pp. 1-2.

Anonymous, "Facebook Spiel Candy Crush Saga: Cheats, Tipps, News and Videos BILDspielt", URL: http://www.bildspielt.de/social-games/3-gewinnt/candy-crush-saga-180643/ [retrieved on Oct. 25, 2013] XP055085339, Apr. 12, 2012, pp. 1-10.

Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.

Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012] XP055092347, Apr. 10, 2012, pp. 1-2.

Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.

Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] XP055109246, Jan. 24, 2012, pp. 1-2.

Anonymous, "King.com Skill Games for iPhone and Facebook: http://www.ubergizmo.com/2009/07/king-com-skill-games-for-iphone-and-facebook/", retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgrefurl=http://www.ubergizmo.com/2009/07/king-com-skill-games-for-iphone-and-faceboo, Jul. 13, 2009, pp. 1-2.

Anonymous, "Minecraft", retrieved from the Internet: URL:http://en.widipedia.org/w/index?title=Minecraft&oldid=409326251 [retrieved on Jul. 1, 2013] XP055068987, May 2, 2014.

Anonymous, "Model-view-controller", retrieved from the Internet: URL:http://en.wikipedia.org/w/index/php?title=Model%E2%80%93view%E2%80%93controller&oldid=511810952 retrieved on Oct. 8, 2013] XP055083072, Sep. 11, 2012, pp. 1-2.

Anonymous, "OpenOffice, Creating Charts and Graphs", Dec. 2004, 1-17.

Anonymous, "Pygame", retrieved from the Internet: URL:http://web.archive/org/web/20120413123244/http://www.pygame.org/wiki/tut_design [retrieved on Oct. 8, 2013 XP055083074, Apr. 13, 2012, pp. 1-5.

Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.

Anonymous, "Why King.com's Candy Crush is crushing it on Facebook", retrieved from the Internet: URL: http://blog.games.com/2012/05/01/why-king-coms-candy-crush-is-crushing-it-on-facebook/ [retrieved on Oct. 25, 2013] XP055085338, May 1, 2012, pp. 1-4.

Collins, "Will Collins Game Spotlight: Candy Crush Saga", retrieved from the Internet: URL:https//developers.facebook.com/blog/post/2012/06/15/game-spotlight-candy-crush-saga/ [retrieved on Oct. 25, 2013] XP055085345, Jun. 15, 2012, pp. 1-2.

Demeter, "Trism: Upcoming iPhone Game by Demiforce", retrieved from the Internet: URL: https://www.youtube.com/watch?v=hy0ptZisr70, [retrieved on Apr. 16, 2015] XP054975820, Feb. 26, 2008.

(56) References Cited

OTHER PUBLICATIONS

Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.
Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.
Josef, "Bloxley Tutorial #1—Sokoban", http://bloxley.net/2010/10/tutorial-1-sokoban, Oct. 13, 2010.
Murphy, "Bejeweled 2 Strategy Guide", www.bigfishgames.com, Aug. 15, 2010.
Namco, "Dig Dug Video Game (copy unavailable)", 1982.
Popcap, "Bejeweled Video Game (copy unavailable)", 2001.
Rua, "Candy Crush Saga Gameplay First Look (Episode 1-10 levels)", retrieved from the Internet: URL: https://www.youtube.com/watch?v=8TleNDnJiN8 [retrieved on Apr. 16, 2015] XP054975821, Apr. 15, 2012.
Schoenau-Fog, "The Player Engagement Process—An Exploration of Continuation Desire in Digital Games", http://www.digra.org/wp-content/uploads/digital-library/11307.06025.pdf, 2011.
Squires, "Bubble Witch Saga is going mobile—Gamezebo", retrieved from the Internet: URL:http://www.gamezebo.com/news/2012/06/27/bubble-witch-saga-going-mobile [retrieved on Dec. 9, 2013] XP055092339, Jun. 27, 2012, pp. 1-2.
Adbang, "[How to block Anipang heart] HOw to block Anipang heart at i-phone", Internet blog, Internet: URL:http://blog.naver.com/cyco5202/110147101106, Sep. 11, 2012.
Goad, ""Why King.com's Candy Crush is crushing it on Facebook"", Games.com [online], Internet: URl:http://blog.games.com/2012/05/01/why-king-comes-candy-crush-is-crushing-it-onfacebook/, May 1, 2012.
Kangbelief, ""Kakao talk, how to reject the undesired invitation message of Anipang and receive the heart quietly"", Internet blog, Internet: URL:http://kangbelief.tistory.com/312, Sep. 16, 2012.
Anonymous, "Salesforce Tutorial—Model View Controller (MVC)", [online] Retrieves from the Internet: <https://web.archive.org/web/20130814042919/http://www.salesforcetutorial.com/model-view-controller-mvc/> [retrieved Jul. 1, 2016], Apr. 10, 2013.
Classic Game Room—Bejeweled 3 review for Nintendo DS, screen shot 1 page, video length 4:22; retrieved from the Internet; URL: https://www.youtube.com/watch?v=pxVGdIJTVxQ ,Dec. 16, 2011.
Sutek's Tomb on YouTube, Screen shot 2 pages, video length 6:59, retrieved from the Internet: URL: https://www.youtube.com/watch?v=D0Z1FN7OSwE ,Aug. 12, 2007.
"Bejeweled Blitz 878,550 Points" elite Technique Legit No Boosts Facebook, YouTube Video, 2 page screen shot; retrieved from the Internet: URL: https://www.youtube.com/watch?v=eusZMBjSD5E.
Lee,Xah et al.,Bejeweled Blitz Strategy as Math, 4 pages ,Sep. 22, 2011.

\* cited by examiner

METHOD OF DESIGNING MULTIPLE COMPUTER GAMES

CROSS-REFERENCE TO RELATED APPLICATIONS

This application is a continuation of co-pending U.S. application Ser. No. 14/029,318, filed Sep. 17, 2013, which is based on, and claims priority to U.S. Provisional Application No. 61/701,907, filed Sep. 17, 2012; UK Application No. 1302121.7, filed Feb. 6, 2013; UK Application No. 1302910.3, filed Feb. 19, 2013; UK Application No. 1304442.5, filed Mar. 12, 2013; UK Application No. 1304444.1, filed Mar. 12, 2013; UK Application No. 1304545.5, filed Mar. 13, 2013; UK Application No. 1306117.1, filed Apr. 4, 2013; UK Application No. 1306118.9, filed Apr. 4, 2013; U.S. Provisional Application No. 61/811,019, filed Apr. 11, 2013; U.S. Provisional Application No. 61/818,702, filed May 2, 2013; U.S. Provisional Application No. 61/827,298, filed May 24, 2013; U.S. Provisional Application No. 61/832,348, filed Jun. 7, 2013; U.S. Provisional Application No. 61/832,355, filed Jun. 7, 2013; U.S. Provisional Application No. 61/832,359, filed Jun. 7, 2013; U.S. Provisional Application No. 61/832,362, filed Jun. 7, 2013; U.S. Provisional Application No. 61/832,364, filed Jun. 7, 2013; U.S. Provisional Application No. 61/832,369, filed Jun. 7, 2013; UK Application No. 1310589.5, filed Jun. 13, 2013; UK Application No. 1310592.9, filed Jun. 13, 2013; UK Application No. 1311119.0, filed Jun. 21, 2013; UK Application No. 1314147.8, filed Aug. 7, 2013; and UK Application No. 1316045.2, filed Sep. 10, 2013, the entire contents of each of which being fully incorporated herein by reference.

BACKGROUND OF THE INVENTION

Field of the Invention
The invention relates to creation of casual social games.
Technical Background
Computer implemented games are a well known game category which allow a player to interact with a computing device to cause the processor to perform certain calculations and typically display a result on a screen or other display device.

Different types of game have evolved from classical arcade games into games that can be played on a handheld device such as a smartphone or personal computer. Some games are also connected to the Internet and the player can play against or compare their score with other users in multiplayer mode.

A common genre of casual games is so-called 'match-3' games. This is a type of tile-matching game where the player manipulates tiles or game objects in order to make them disappear according to a matching criterion. In many tile-matching games, that criterion is to place a given number of tiles of the same type so that they adjoin each other. That number is often three, and the corresponding subset of tile-matching games is referred to as 'match-three games'.

Games have previously been developed and programmed on an individual basis with all or most elements being built up specifically for that game. Our approach uses the model-view-controller (MVC) software architecture pattern to create games of a specific type. MVC separates the representation of information from the user's interaction with it. This can be implemented in several ways, some of which are already known.

This approach drastically simplifies the way games can be built and also enhances the quality of the games created using this approach since fewer parts of the game have to be recreated for each new game of the same or similar type.

DISCUSSION OF RELATED ART

Casual social games have been implemented before and are known. However previous inventions have not successfully devised effective solutions to create games using a modular approach.

SUMMARY OF THE INVENTION

A first aspect is:
A method of designing multiple computer games, using a software module running on a processor, in which the module enables pre-defined kinds of game design functions to be implemented across multiple different computer games;
 and in which the module implements multiple pre-defined kinds of common game design functions;
 and is extensible in that new components can be added to the module to create new functionality.
Any one or more of the following optional features may be included, resulting in a method:
 in which the module uses a Model View Controller (MVC) software architecture pattern.
 in which the MVC uses entities, and enables components to be combined to create new entities.
 in which the common game design functions include generating a game board of defined size and layout.
 in which the common game design functions include game rules or game-play logic, such as switching objects, matching objects, removing objects, and generating objects.
 in which the common game design functions include all of switching objects, matching objects, removing objects, and generating objects
 in which the common game design functions include common game rules
 in which the module allows new game rules to be designed and included within the module
 in which the common game design functions include creating new game levels
 in which the module enables debug tracking data to be stored, such as storing the board state, history of all moves.
 in which the module receives events that trigger the game logic to be processed and then fires off new events that can be used to draw graphics.
 which includes the step of:
  using data analytics to understand the impact of changes to the game design in terms of player engagement and/or monetisation and;
  implementing changes to the game design, including frequent changes such as daily or weekly changes, to optimise player engagement and/or monetisation.
 which includes the step of deploying multiple different computer games on a game playing web site hosting a large number of computer games, the games each including the software module;
  using data analytics to measure player engagement and/or monetisation of a game;
  for games that provide sufficiently high levels of player engagement and/or monetisation, migrating those games to a platform that supports mobile game play on smartphones, tablets and also PCs.

in which, for games that provide sufficiently high levels of player engagement and/or monetisation, the further step of using the software module to add extra game play levels and additional game design functions.

including the step of using the software module to regularly add extra game play levels and additional game design functions, potentially indefinitely.

when used to enable social casual games to be rapidly created and revised.

when used to enable switcher games to be rapidly created and revised.

when used to enable match-3 games to be rapidly created and revised.

when used to enable clicker games to be rapidly created and revised.

DETAILED DESCRIPTION

The present invention relates to a software architecture module that can be used when creating a game. The following description will use a 'switcher' game as an example of a typical implementation of the module. It is however understood that the invention can be implemented for other types of game such as 'clicker' and 'bubble shooter' games.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

The terms user and player are used interchangeably throughout this document and no specific meaning is intended using one or the other unless the context suggests otherwise.

Figure 1:
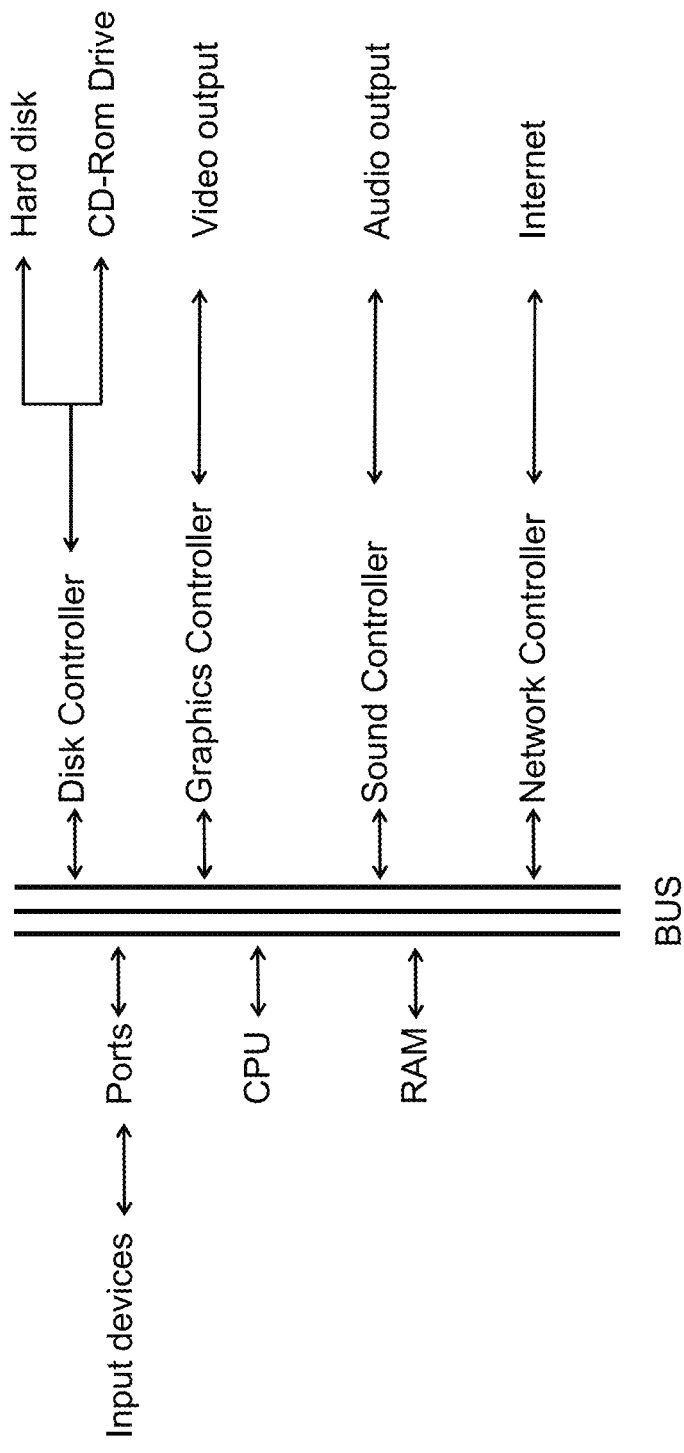
FIG. 1 shows a schematic illustration of a computing device.

FIG. 1 shows a schematic picture of a computing device, containing a Central Processing Unit and Random Access Memory. The CPU acts according to input given from input devices, such as a keyboard, mouse or touchscreen. Computer BUSes are used to communicate, both between input devices and the CPU, but also between different controllers within the computer device, such as the graphics controller and the network controller. These controllers in turn communicate with external devices, such as a monitor for video output with which the graphics controller communicates, and the network controller communicates with for instance the internet, through wireless or wired connections. A user can interact with the computing device through input devices, such as a pointing device (e.g. a mouse) and a keyboard.

Figure 2:
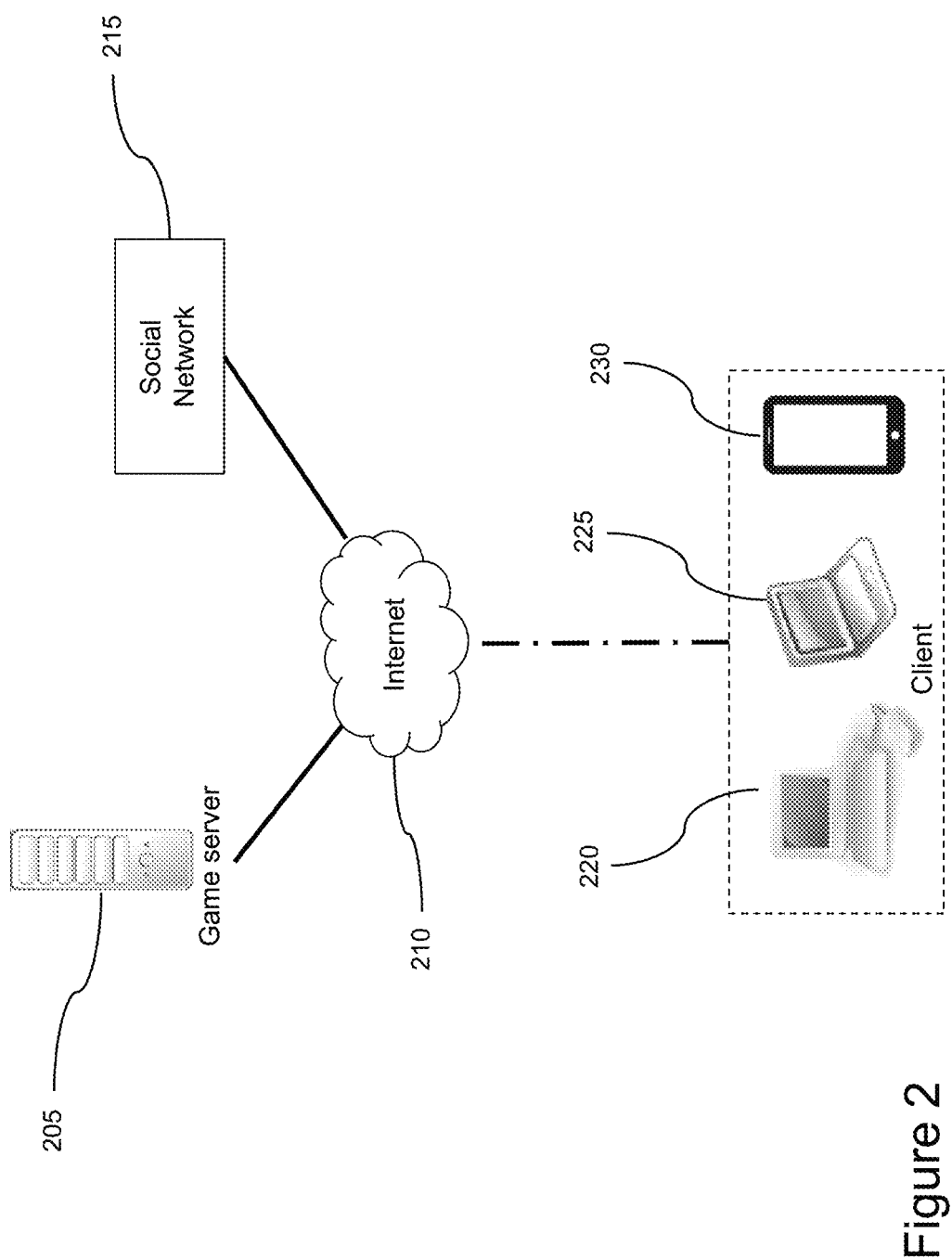
FIG. 2 shows an exemplary environment.

FIG. 2 portrays an exemplary overall environment in which the present invention may be utilized. A virtual game is stored on for instance a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other network. It should be understood that the social network 230 and the game server 210 does not have to be located in different places, they could be on the same server or on a plurality of servers located in different locations. People skilled in the art will understand that other devices than the exemplary ones listed can be also be used without departing from the spirit and scope of the invention.

Different Implementations

The techniques described in this patent may be deployed in many different gameplay architectures. For example, a computer game may be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game created using the techniques disclosed herein may be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the spirit or scope of the invention.

Game Overview

Figure 4:
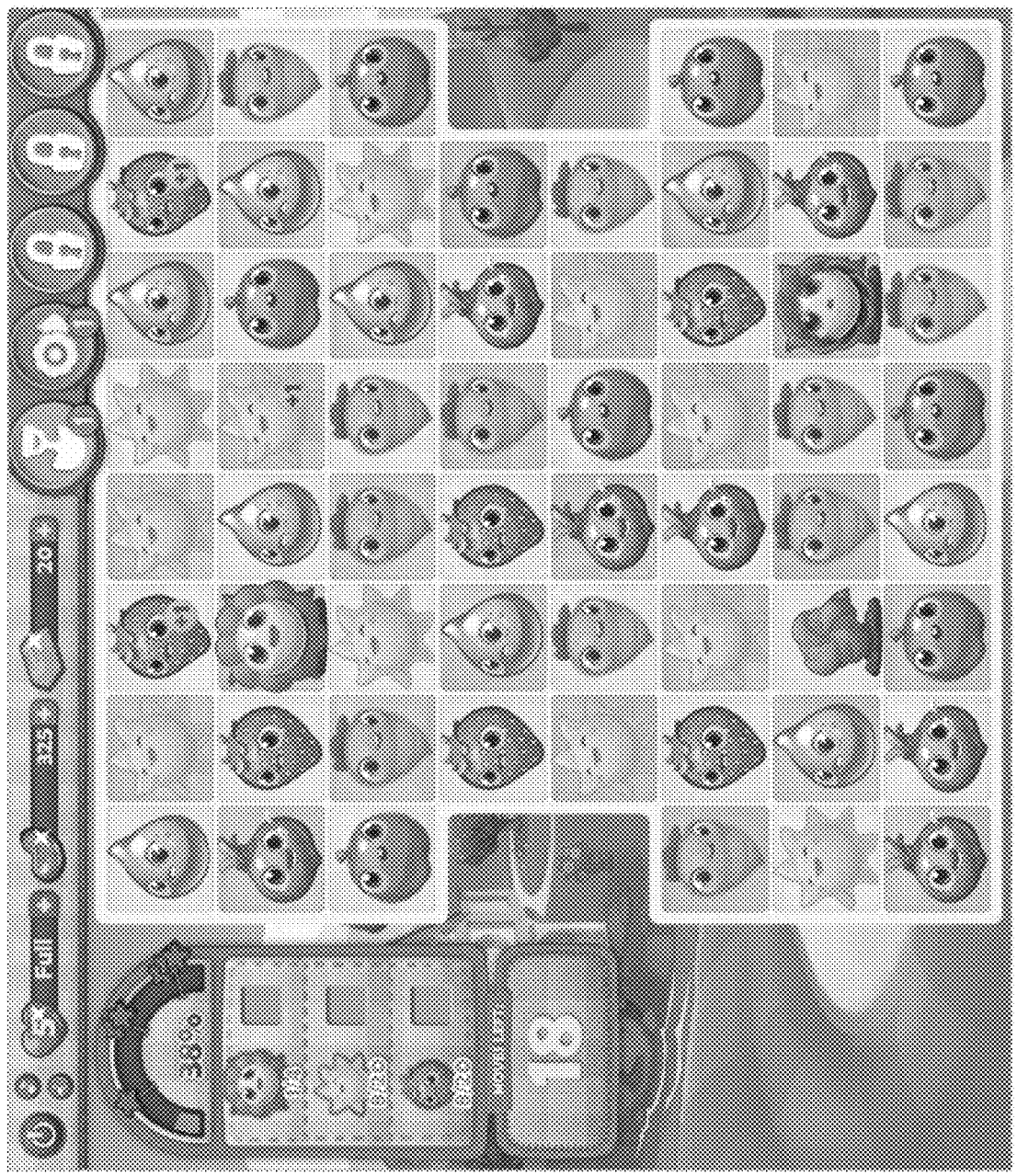
FIG. 4 shows an example of a 'match-3' switcher game.
Figure 5:
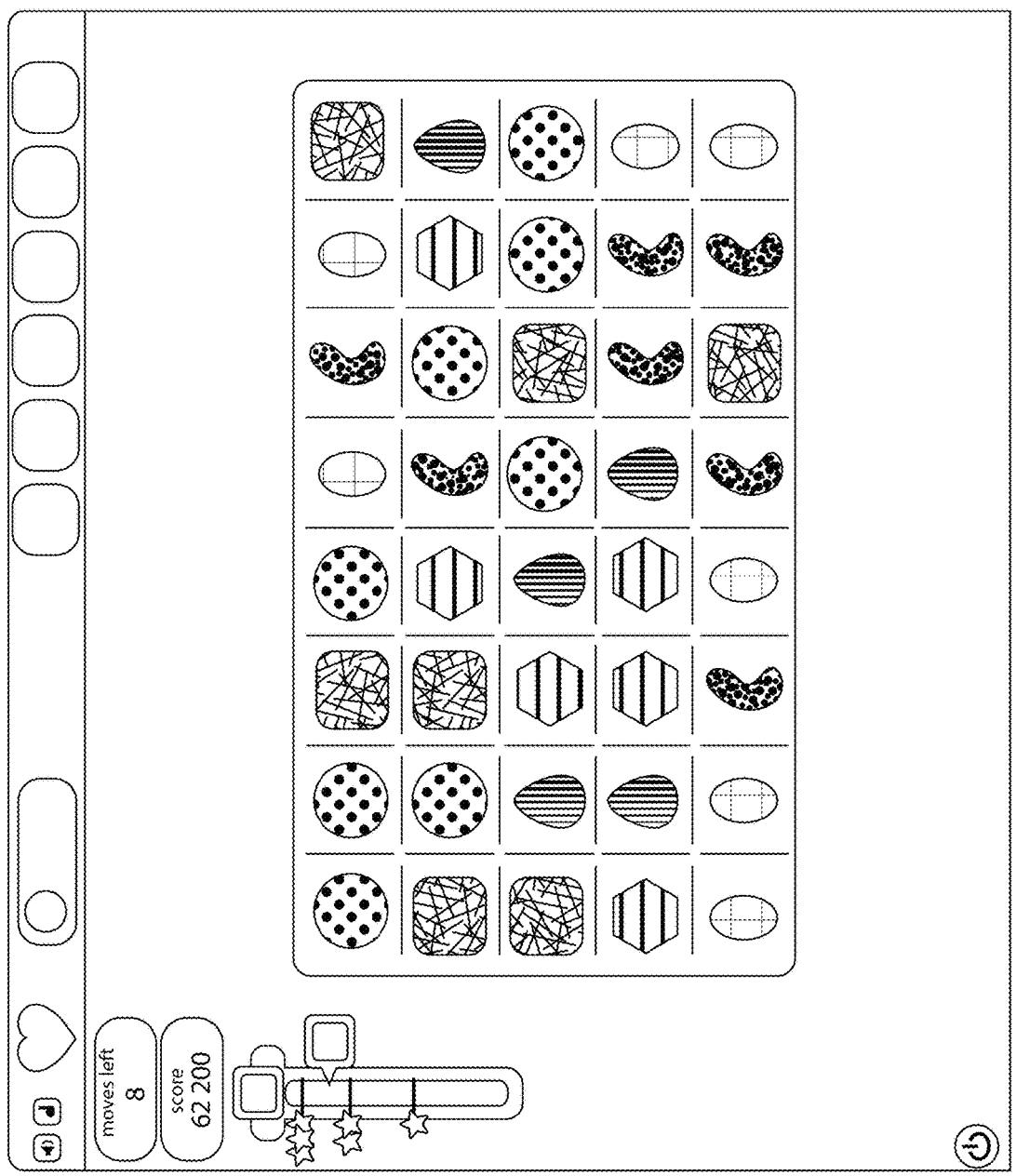
FIG. 5 shows an example of a 'match-3' switcher game.

In a typical match-3 switcher game different game elements are swapped with each other to make moves on a game board. FIG. 4, FIG. 5 show exemplary implementations of a match-3 game. To gain points the player has to make moves that create matches of at least three of the same candy. If doing so, the player gains points and the matched candies are removed from the game board. As a result, new candies fall into place from the top of the game board in order to fill any empty spaces created. For all candies that are removed on the game board, points may be shown in the same colour as the candy that was removed, for example three red candies will show red points, green candies green points and so on. If a blocker element would be removed then the points shown would be in the same colour as the candies from the match that removed it.

Only swapping moves that will create at least one combination of at least three game elements of the same type are allowed.

If the player makes a match of more than 3 elements certain other new elements may appear on the game board. For instance in a typical match-3 switcher game a combination of four game elements may generate a special game element that if combined will remove one whole row or column on the game board. A combination of five game elements may generate a special game element that removes all game elements of a certain type if included in a match of game elements of that type.

A typical game mode of a match-3 switcher game provides the player with a limited number of moves to reach the level target.

Modular Approach

Specifically in computer games and game engines, entity is a dynamic object such as a non-player character or item. The invention can be referred to as a part of an entity system where components are used to form a whole.

The game module covers the game play of a computer game. The game module typically does not cover server communication, level progression and social network integration.

The switcher game module plays the part of the basic model for any switcher game, for example, common notions in switcher games such as switching objects every turn, matching same items, etc., are handled by the module.

Key aspects of a switcher game can be to have a board of x height and y width, elements on the board that need to be matched, matching patterns to match those elements, removal of elements when matched, element generation and randomization, game rules.

In a most basic implementation, a game development team would take the switcher module, add classes to handle drawing graphics and some data files to define their board elements and they would have a working switcher game.

The module receives events that trigger the game logic to be processed and fires off new events that can be used to draw the graphics. Practically, the game team would need to add game specific features to make their game unique, but having the switcher module would give a very big advantage since it would provide them with a big chunk of the code needed for free. Another big plus is that it was designed with that in mind, so there should be minimal effort in understanding it and implementing the visuals and adding the game specific features.

The game module can be used for games that are designed to work stand-alone and for games that for instance require a connection to a social network.

The module may in some implementations have functions that generally are used by a switcher game. For instance, a module for a switcher game can include the following functions:

Generating a board of variable size to play the game on. It provides different generators for that purpose (random, fixed, mode-specific) and can easily be extended with more.

Common switcher game-play logic. All switcher games need to switch elements, match them, remove them when matched, add new ones to replace the removed one, shuffle when there are no moves. The switcher module handles all this.

Common game rules. A switcher game will end under various conditions such as no moves left, score achieved, specific items collected. The module handles these basic rule cases and allows them to be extended with more.

When something goes wrong in a game, it is great if the developers have debug information (such as the board state, the switch made, etc.) in order to fix the issue. The module provides all that.

A structure that we call entity system that allows us to create new types of elements for the game by combining components. For example, if you need an element that can be matched and creates an explosion, you create a matchable and an explosion component. If you need an element that can be matched and does not move, you reuse the matchable component and add an unmovable component. The module has a variety of such components and allows for the easy addition of new ones.

A level editor that is used for creating levels.

Examples of specific commands that may be used in the switcher are:

Prepare game—A command for preparing the game so that it can be played.

Prepare board generator—A command for activating a generator for generating a playing board.

Prepare tunnels—A command for creating tunnels.

Handle board create failed—A command for handling cases when the board generation has failed Ensure no board selection—A command for ensuring nothing is selected on the board Set possible swaps—A command for determining the swaps that it is possible to make.

Handle board object dragged—A command for determining what happens when an object on the board is dragged.

Handle board object clicked—A command for determining what happens when an object on the board is clicked.

Apply match effects—A command for executing what happens when objects are matched.

Decrement moves until drop down item is spawned

Update item target progress—A command for updating the target objects to match

Add score from matches—A command for adding scores from a match to, for instance, a top list.

Reset score multiplier—A command for resetting a multiplier for the player's score.

Check collectible items—A command for checking for collectible items.

Award collection score—A command for awarding a player for collecting items.

Remove destructibles—A command for removing objects that can be destroyed.

Apply remove effects—A command applying relevant effect after an object is removed Handle player move ended—A command for determining what happens when a player makes a move Handle shuffle failed—A command for determining what happens when a shuffle does not generate any possible moves.

Select booster effect tile—A command for choosing where the effect a booster will happen.

Select booster—A command for selecting a booster.

Unselect booster—A command for de-selecting a booster that has been selected.

Use boosters that should be used instantly—A command for using boosters that give an instantaneous effect.

Use booster—A command for using a booster.

Try swap items—A command for swapping items.

End swap items—A command for triggering events supposed to happen after a swap

Drop floating items—A command for dropping items in empty spots underneath them.

Fill empty tiles with random items—A command for filling empty tiles in the game with randomized items.

Remove matched items—A command for removing matched items.

Board model—Holds information about the state of the board and the objects on it.

Pass processor—Processes the board after a match.

Pass terminator—Handles the condition after a pass will terminate.

Start—Starting the pass processor.

Make pass—Making one pass with the processor.

Figure 3:
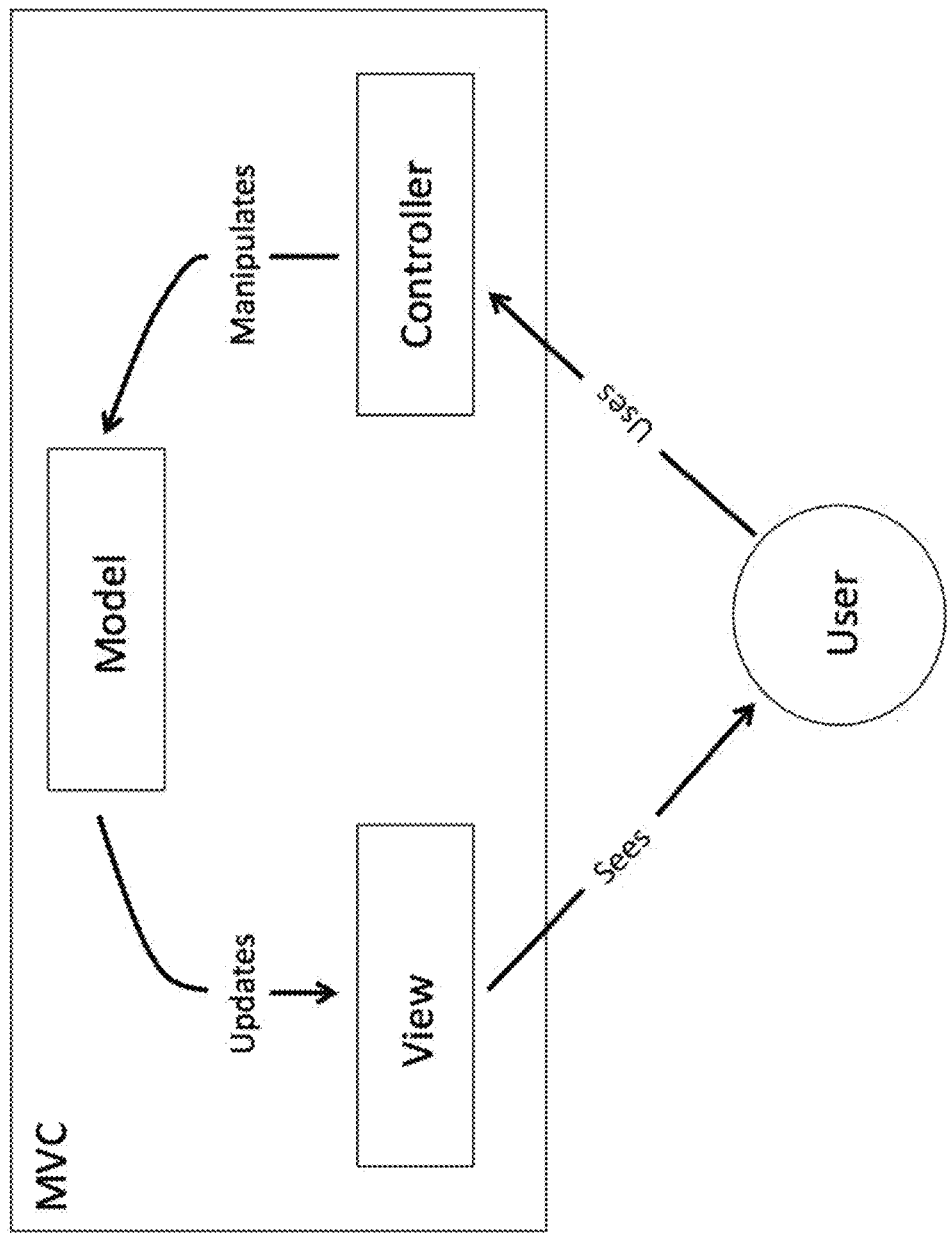
FIG. 3 shows an example of a typical MVC software architecture.

In addition to dividing the application into three kinds of components, the MVC design defines the interactions between them. FIG. 3 shows an example of a typical MVC software architecture.

A controller can send commands to its associated view to change the view's presentation of the model (e.g., by scrolling through a document). It can also send commands to the model to update the model's state (e.g., editing a document).

A model notifies its associated views and controllers when there has been a change in its state. This notification allows the views to produce updated output, and the controllers to change the available set of commands. A passive implementation of MVC omits these notifications, because the application does not require them or the software platform does not support them.

A view requests from the model the information that it needs to generate an output representation.

Dependency Hierarchy

There is usually a kind of hierarchy in the MVC pattern. The Model only knows about itself. That is, the source code of the Model has no references to either the View or Controller.

The View, however, knows about the Model. It will poll the Model about the state, to know what to draw. That way, the View can draw something that is based on what the Model has done. But the View knows nothing about the Controller.

The Controller knows about both the Model and the View. To take an example from a game: If you click on the "fire" button on the mouse, the Controller knows what fire function in the Model to call. If you press the button for switching between first and third person, the Controller knows what function in the View to call to request the display change.

The reason to keep it this way is to minimize dependencies. No matter how the View class is modified, the Model will still work. Even if the system is moved from Windows to an app in a smart phone, the Model can be moved with no changes. However, the View and the Controller probably need to be updated.

The module is extensible so that additional features for that type of game can be added.

The extensibility of the module is twofold. On one hand, there is the previously mentioned entity system. That is using a design technique also known as component structure, which allows combining components to create entities.

An example from the production of King's game Farm Heroes Saga will be used to showcase the strength of the system. Sometime midway during production, a new element for the game called 'Fount' was implemented. The Fount should be destroyed after a match of other elements was done next to it 3 times.

In a different architecture, a developer would need to write new logic that does all this. Without the entity system, that could take anything from 1 to 2 weeks for one developer. Having the entity system, it is possible to reuse components that were created for other types of elements. For example, the 'destructible' component with health 3 was used to implement the part when the fount is destroyed after next matches next to it. The fact that the matches need to be next to it and not on it or on the other side of the board was taken care by setting the already existed attribute "fromOutline" to true. The whole feature was done in pretty much a day or two by adding code for the visuals and very few lines of logic code.

The other side of this being extensible is that the module itself was made to be reused. Any game that uses it is by definition an extension of the module. It is architected so that it makes it easy to either use the existing functionality or override parts of it at will to implement slightly or vastly different game behaviour.

Working with badly structured code is a problem for developers. Such code is hard to understand, hard to extend and extremely expensive to maintain in the long run. Also, it is preferable to reuse as much as possible when creating new code, so as to avoid unnecessary work. A Model View Controller based approach makes this possible.

Another issue that most game code bases have is a distinct lack of unit tests. Unit tests are the proof that the code works as intended. In order for code to be reused and trusted by other developers, it needs to be extensively covered with unit tests.

Social Aspect

Connection to a Social Network

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

Ways of Playing the Game
Web-Based

One way of implementing a game using the techniques described herein is through a web site with a plurality of casual games. This platform can be used as a basis to test the performance of the game and how it is perceived by players. In some web-based implementations the game is implemented to be played in head-to-head tournaments, has a limited number of levels and no external social network connection. In some implementations the players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new titles.

Virtual Map

Figure 6:
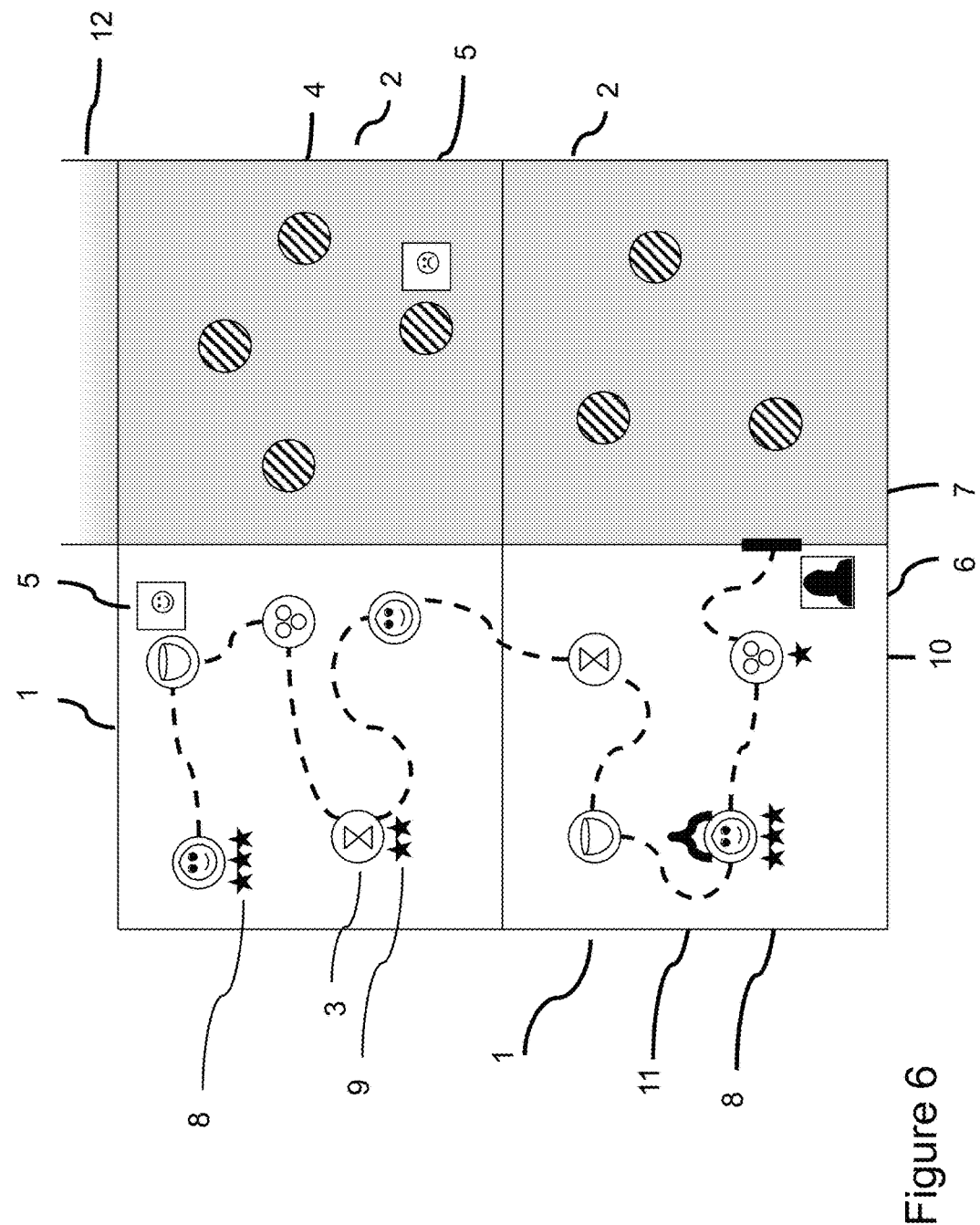
FIG. 6 shows an implementation of a virtual map.

The game can be implemented so that a player progresses through multiple levels of changing and typically increasing difficulty. FIG. 6 shows an implementation of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players, and also opportunities for viralisation and monetisation.

The virtual map consists of stages 1, 2 with varying number of levels 3, 4 represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

Stages in the game can be both locked or unlocked. In most implementations, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some implementations, certain levels and stages are locked based on other criteria than the player's linear progression in the game. Such levels can for instance be based on the total score the player has achieved on all levels, the average performance on levels or on the number of friends that the player has invited to play the game.

In one implementation, one challenge 7 to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friend and payment to unlock the new stage. The cost for unlocking can in some implementations be lowered as a fraction of the total number of friends needed when help from some but not all needed friends have been received.

There can be ways of getting past a collaboration block other than asking friends for help and paying for it, which are the most common ways of passing a collaboration block. This can be done through to use of 'Mystery Quests', which gives the player the option of completing one or several challenges to unlock the block. Such challenge can for instance be to play one or several past levels with modified goals in order to pass the collaboration block, for instance three levels—one for each of the locks.

These challenges are typically in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to the game is connected. This is one of the viralisation techniques implemented in this game.

In addition to the virtual map layout in FIG. 6, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 6 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 6. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores.

The player is in some implementations of the game rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 8, 9, 10.

In the map view, the player can hover over an unlocked level to display a thumbnail version of it. This makes it easier to find specific already completed levels, and can also give the player an idea of what to expect before actually starting a level. In a typical implementation, thumbnails cannot be displayed for levels that have not yet been unlocked. If trying to view one of these a symbol of a padlock will be in the place the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, that has the highest score. There can in some embodiments be a notification 11 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 3 can for instance be in the form of an object related to the game goal, such as an hourglass representing a level with a time constraint.

The invention claimed is:

1. A computer implemented method, using a first software module comprising a model module for use in at least one switcher computer game, said method being performed in a computing device, comprising one or more processors and a display, by executing computer code on said one or more processors to perform the steps of:
controlling the display to display a game board comprising a plurality of game elements which are configured to he switched or matched in response to user input;
receiving at the model module, commands from a controller module running on said processor to update state of the model module;
in response to a change in the state of said model module, sending, from the model module, notifications to said controller module to change an available set of the commands and to a view module running on said processor to produce updated output to be displayed; and
wherein the model module comprises a plurality of components each providing a game function of said at least one switcher computer game,
wherein said plurality of components comprises a plurality of combinable components reusable for different game elements of said at least one switcher computer game,
each combinable component providing at least one in game action performable by at least some of said different game elements, wherein each in game action is modifiable by at least one parameter,
wherein a game element of said different game elements is provided by combining two or more of said combinable components providing different in game actions.

2. The method of claim 1 in which the first software module uses a Model View Controller (MVC) software architecture pattern.

3. The method of claim 2 in which the MVC uses entities, and enables components to be combined to create new entities.

4. The method of claim 1 in which the game functions provided by said plurality of components include generating a game board of defined size and layout.

5. The method of claim 1 in which the game functions provided by said plurality of components include game rules or game-play logic.

6. The method of claim 1 in which the game functions provided by said plurality of components include all of switching objects, matching objects, removing objects, and generating objects.

7. The method of claim 1 in which the game functions provided by said plurality of components include common game rules.

8. The method of claim 1 in which the first software module allows new game rules to be designed and included within the first software module.

9. The method of claim 1 in which the game functions provided by said plurality of components include creating new game levels.

10. The method of claim 1 in which the first software module enables debug tracking data to be stored.

11. The method of claim 1 in which the first software module receives events that trigger the game logic to be processed and to draw graphics.

12. The method of claim 1 which includes the step of:
using data analytics to understand the impact of changes to the game design in terms of player engagement and/or monetisation and;
implementing changes to the game design, including frequent changes such as daily or weekly changes, to optimise player engagement and/or monetisation.

13. The method of claim 1 which includes the steps of:
deploying multiple different computer games on a game playing web site hosting a number of computer games, the games each including the first software module;
using data analytics to measure player engagement and/or monetisation of a game;
for games that provide a threshold level of player engagement and/or monetisation, using the first software module to adapt those games for play on a platform that supports mobile game play on smartphones, tablets and also PCs.

14. The method of claim 1 in which, for games that provide a threshold level of player engagement and/or monetisation, the further step of using the first software module to add extra game play levels and additional game design functions.

15. The method of claim 1 including the step of using the first software module to regularly add extra game play levels and additional game design functions, potentially indefinitely.

16. The method of claim 1, wherein the first software module enables social casual games to be rapidly created and revised.

17. The method of claim 1, wherein the first software module enables switcher games to be rapidly created and revised.

18. The method of claim 1, wherein the first software module enable match-3 games to be rapidly created and revised.

19. The method of claim 1, wherein the first software module enables clicker games to be rapidly created and revised.

20. A computing device comprising a model module for use in at least one switcher computer game, said module configured in use to run on a processor of the device, wherein the device is configured to display a game board comprising a plurality of game elements which are configured to be switched or matched in response to user input,
wherein the model module is configured to receive commands from a controller module running on said processor to update state of the model module, said model module further configured to, in response to a change in the state of said model module, send notifications to said controller module to change an available set of the commands and to a view module running on said processor to produce updated output to be displayed,
wherein the model module comprises a plurality of components, each of said plurality of components configured to provide a game function of said at least one switcher computer game,
wherein said plurality of components comprises a plurality of combinable components reusable for different game elements of said at least one switcher computer game each combinable component providing at least one in game action performable by at least some of said different game elements, wherein each in game action is modifiable by at least one parameter, wherein a game element of said different game elements is provided by combining two or more of said combinable components having different game functions.

* * * * *